United States Patent [19]

Buckholz, Jr. et al.

[11] Patent Number: 5,004,618

[45] Date of Patent: * Apr. 2, 1991

[54] PROCESS FOR PREPARING MARINADED PROTEINACEOUS PRODUCT AND PRODUCT PRODUCED THEREBY

[75] Inventors: Lawrence L. Buckholz, Jr., Middletown; Robin Kasper-Lehmann, Elberon, both of N.J.

[73] Assignee: International Flavors & Fragrances Inc., New York, N.Y.

[*] Notice: The portion of the term of this patent subsequent to Jul. 17, 2007 has been disclaimed.

[21] Appl. No.: 535,539

[22] Filed: Jun. 8, 1990

Related U.S. Application Data

[63] Continuation-in-part of Ser. No. 457,162, Dec. 26, 1989, Pat. No. 4,942,047, which is a continuation-in-part of Ser. No. 371,074, Jun. 26, 1989, abandoned, which is a continuation-in-part of Ser. No. 114,057, Oct. 29, 1987, abandoned.

[51] Int. Cl.$^5$ .......................... A23L 1/31; A23L 1/315
[52] U.S. Cl. ..................... 426/281; 426/302; 426/533; 426/589; 426/641; 426/644
[58] Field of Search ............... 426/281, 302, 533, 589, 426/641, 643, 644, 650, 652, 656

[56] References Cited

U.S. PATENT DOCUMENTS

| | | | |
|---|---|---|---|
| 3,394,016 | 7/1968 | Bidmead et al. | 426/533 |
| 3,552,978 | 1/1971 | Inklaar | 426/281 |
| 3,681,095 | 8/1972 | Inklaar | 426/281 |
| 3,695,892 | 10/1973 | Reinke | 426/281 |
| 4,081,565 | 3/1978 | Chhuy et al. | 426/533 |
| 4,514,431 | 4/1985 | Buckholz et al. | 426/641 |

*Primary Examiner*—Arthur L. Corbin
*Attorney, Agent, or Firm*—Arthur L. Liberman

[57] ABSTRACT

Described is a process for producing a marinaded proteinaceous product, such as a marinaded chicken meat, whereby the resulting product has a savory flavor, such as a teriyaki flavor, comprising the steps of:
  (a) providing a meat muscle tissue inner food core;
  (b) preparing a mixture of:
   (i) an inorganic phosphate salt;
   (ii) water; and
   (iii) a reaction flavor which is a reaction product of cysteine hydrochloride, thiamine hydrochloride and macerated meat;
  (c) coating the mixture of (b) onto the surface of the meat of (a) and keeping the coating on the meat for such a period of time as to cause the meat to permanently absorb or adsorb the flavor composition of (b); and
  (d) cooking the resulting product.

12 Claims, 2 Drawing Sheets

PROCESS FOR PREPARING MARINADED PROTEINACEOUS PRODUCT AND PRODUCT PRODUCED THEREBY

PRIOR RELEVANT APPLICATIONS

This application is a continuation-in-part of application for United States Letters Patent, Ser. No.457,162 filed on Dec. 26, 1989, now U.S. Pat. No. 4,942,047, which in turn is a Continuation-in-Part of application for United States Letters Patent, Ser. No.371,074 filed on June 26, 1989, now abandoned, which in turn is a Continuation-in-Part of application for United States Letters Patent, Ser. No.114,057 filed on Oct. 29, 1987, now abandoned.

BACKGROUND OF THE INVENTION

Our invention concerns the production of a marinaded proteinaceous foodstuff using a novel marinade composition of matter enabling permanent absorption of flavor precursors and/or reaction flavor compositions into a proteinaceous inner food core prior to cooking the resulting marinaded food product.

The art of using marinades is well known. Thus, the publication "Chicken Breasts", Diane Rozas published by Harmony Books/New York, 1985 sets forth on page 11 thereof:

> Marinades: There are two types of marinades, wet and dry. Wet marinades include enough liquid to partially immerse chicken breasts before cooking and later are also used as basting sauces. Dry marinades usually include a combination of herbs and spices and perhaps a small amount of oil, which is rubbed into the chicken. After combining the marinade ingredients with the chicken breast, allow enough time for the flavors to penetrate. Luckily, chicken breasts absorb flavors quickly: 1 to 4 hours at room temperature. Some wet marinades, such as those with lemon juice or wine, also act as tenderizers. Liqueurs impart strong flavors, so use them sparingly.

At page 49 of the Rozas textbook a "Chinese Marinade" is indicated to be capable of being prepared for chicken, thusly:

Enough for 2 pounds of chicken breasts
3 tablespoons soy sauce
2 tablespoons honey
2 tablespoons hoisin sauce
2 tablespoons white wine vinegar
2 tablespoons rice wine or pale dry sherry
1 teaspoon crushed garlic
1 teaspoon minced ginger root
1 teaspoon sugar
2 tablespoons chicken stock
2 tablespoons Chinese plum sauce (available in Oriental markets)

Marinate chicken breasts in the above ingredients for at least 2 hours before grilling or broiling.

At page 54 of the Rozas textbook, "Tandoori Chicken" using marinade is indicated to be prepared, thusly:

4–6 servings
3 whole chicken breasts (about 3 pounds), halved
½ cup plus 2 tablespoons fresh lemon juice
1 teaspoon salt
¼ teaspoon powdered saffron (or 2 saffron threads, minced)
2 teaspoons crushed coriander seeds
¼ teaspoon dried red pepper flakes
1 teaspoon cumin
2 large garlic cloves, coarsely chopped
1 teaspoon finely chopped ginger
1 cup plain yogurt
4 tablespoons (½ stick) butter 1. Prick the chicken breasts all over with a fork several times so the marinade can penetrate the breast meat.
2. Arrange the chicken breasts in a single layer in a shallow glass or ceramic dish.
3. In a bowl, combine ½ cup of the lemon juice, salt, and saffron. With your hands, rub this mixture into the chicken breasts.
4. In a small skillet over medium heat, toast the coriander seeds, red pepper flakes, and cumin for about 2 minutes, stirring constantly. Place in a food processor; add the garlic, ginger, and 4 tablespoons of the yogurt, and blend for 30 seconds. Add the remaining yogurt, mix well, and pour over the chicken breasts. Cover tightly and marinate at room temperature for at least 12 hours (or 24 hours in the refrigerator), turning the breasts several times.
5. Prepare the grill or heat the broiler. In a small saucepan over medium heat, melt the butter. Remove the chicken from the marinade and drain off the excess. Baste the chicken breasts with the butter and grill 7 to 9 inches from the hot coals for 4 to 5 minutes on each side, starting with the bone side toward the heat.
6. When the chicken breasts are done, sprinkle with the remaining 2 tablespoons of lemon juice.

At page 55 of the Rozas textbook "Red Wine Marinade"—is indicated to be prepared, thusly:

2–4 servings
2 whole chicken breasts (about 2 pounds), halved
Salt and black pepper to taste
Marinade
¼ cup olive oil
2 medium onions, chopped
1 cup tomato puree
1 teaspoon dried basil (or 1 tablespoon finely chopped fresh basil)
¼ cup honey
¼ cup chicken stock
3 tablespoons Worcestershire sauce
1 teaspoon dry mustard
1 cup Italian dry red wine 1. Sprinkle the chicken breasts with salt and pepper.
2. In a heavy skillet over medium heat, heat the olive oil. Saute the onions until soft. Add the tomato puree, basil, honey, stock, Worcestershire sauce, and mustard; mix together well. Reduce the heat to low and simmer for 15 minutes. Add the wine in the last minute of cooking and heat through. Let cool to room temperature.
3. Arrange the chicken breast pieces in a single layer in a shallow glass or ceramic dish; pour on the marinade and let stand at room temperature for 3 hours, turning several times to coat well.
4. Prepare the grill or heat the broiler. Beginning bone side down, cook the chicken breasts 7 to 9 inches from the coals for 4 to 5 minutes on each side, basting several times.

At page 90 of the Rozas textbook a "Vegetable Marinade" is indicated to be useful for chicken breasts, thusly:

---
Vegetable Marinade
---
⅓ cup olive oil
¼ cup white wine vinegar
2 tablespoons sherry wine vinegar
Salt and black pepper to taste
6 whole large red cabbage leaves
1 bunch large fresh spinach leaves, washed and stems removed
1 pound small tube pasta, such as a penne or ziti cooked until al dente, rinsed, drained, and chilled
2 scallions (white and green parts), minced
½ pound cherry tomatoes
1. In a large saucepan or stockpot, bring the stock to a boil; stir in the salt and pepper. Add the chicken breasts, arrange in a single layer, and cover. Lower the heat and simmer 8 to 10 minutes, or until firm. Remove from the heat, uncover, and let cool in the stock. Remove the skin and bones. Cut the chicken breasts into bite-size pieces. Transfer to a large bowl and add the oil, vinegar, garlic, and scallions. Toss gently; refrigerate, covered, until you are ready to assemble the salad.
2. Mix the vegetables with the marinade ingredients. Toss, cover, and refrigerate.
3. To prepare the serving platter, ring the outer edge with the large cabbage leaves. In the center, create a bed for the chicken breast mixture using the spinach leaves. At the last minute, toss the pasta and the vegetables together. Place on the platter, leaving a well in the center for the chicken. Place the chicken in the well, sprinkle with scallions, and decorate the platter with cherry tomatoes. Keep refrigerated until serving time.
---

Duxbury, Food Processing, June, 1987, at page 131 and 132 (title: "Marinade/flavor/coating system for further processed poultry (Poultry Show attendees like new tastes and 'added value')" discloses:

... A combination marinade/flavor/glaze coating system developed from marinated or pumped chicken and turkey meats offered samplers an array of traditional international flavors (Cajun—a down home bayou flavor; Sate—an Indonesian peanut sauce; Tandoori—a punjabi grilled meat seasoning typical of East Indian Toonduri (clay pot) cooking). Other flavored glaze seasonings suggested and available for marinated meats include a hot and spicy Oriental, Mexican, Italian and traditional barbecues.

Process/consumer benefits

Marinating further processed poultry products with a marinade and flavor glaze coating system offers processors a number of benefits. The marinade/pump solution has a tenderizing affect which yields a naturally juicy and succulent meat flavor in the product. Finished yield is improved by the pickup weight added to refrigerated or frozen product--and this reduces the cookout losses to the consumer.

If the product is processed and marketed as a precooked item, the marinade solution will compensate for all or part of the processor cooking losses (depending on frying temperature and time and on percent of pump pickup). Precooked products offer further added value to consumers in the form of convenience and ease of preparation . . . Preparation of the marinated meat for application of the flavored glazed coating includes tempering to 28° F. and either immersing or coating the meat surfaces with a liquified (110° F.) butter-flavored hydrogenated shortening (or an alternative clarified butter or margarine) . . .

Rockland, et al, U.S. Pat. No. 4,159,351, discloses the preparation of mixed bean salads. The beans are shown to be treated with a processing composition which includes a phosphate (see the Table at the top of column 4). Following treatment with the processing solution, the beans are immersed in a marinade which can contain salt and a flavoring component. No phosphate is specifically introduced into the marinade.

Cheng, U.S. Pat. No. 4,683,139, discloses a method for the preparation of fresh meat involving treating the meat with a solution containing a phosphate compound, a sodium or potassium salt of an organic acid and another acid or salt thereof.

Trenkle, U.S. Pat. Nos. 4,253,332 and 4,284,654 disclose an example showing marination of beets. The compositions are disclosed as containing a large number of possible components including salt and a phosphate. This is specifically set forth at columns 19 and 20 of U.S. Pat. No. 4,250,331.

Nothing in the prior art, however, discloses the use of such reaction flavors as those set forth in the following U.S. Letters Patent taken in conjunction with a phosphate for purposes of marinading proteinaceous inner food cores:

U.S. Pat. No. 4,076,852 issued on Feb. 28, 1978; and
U.S. Pat. No. 4,081,565 issued on Mar. 28, 1978.

The disclosure of the foregoing patents are incorporated herein by reference.

SUMMARY OF THE INVENTION

Figure 1:
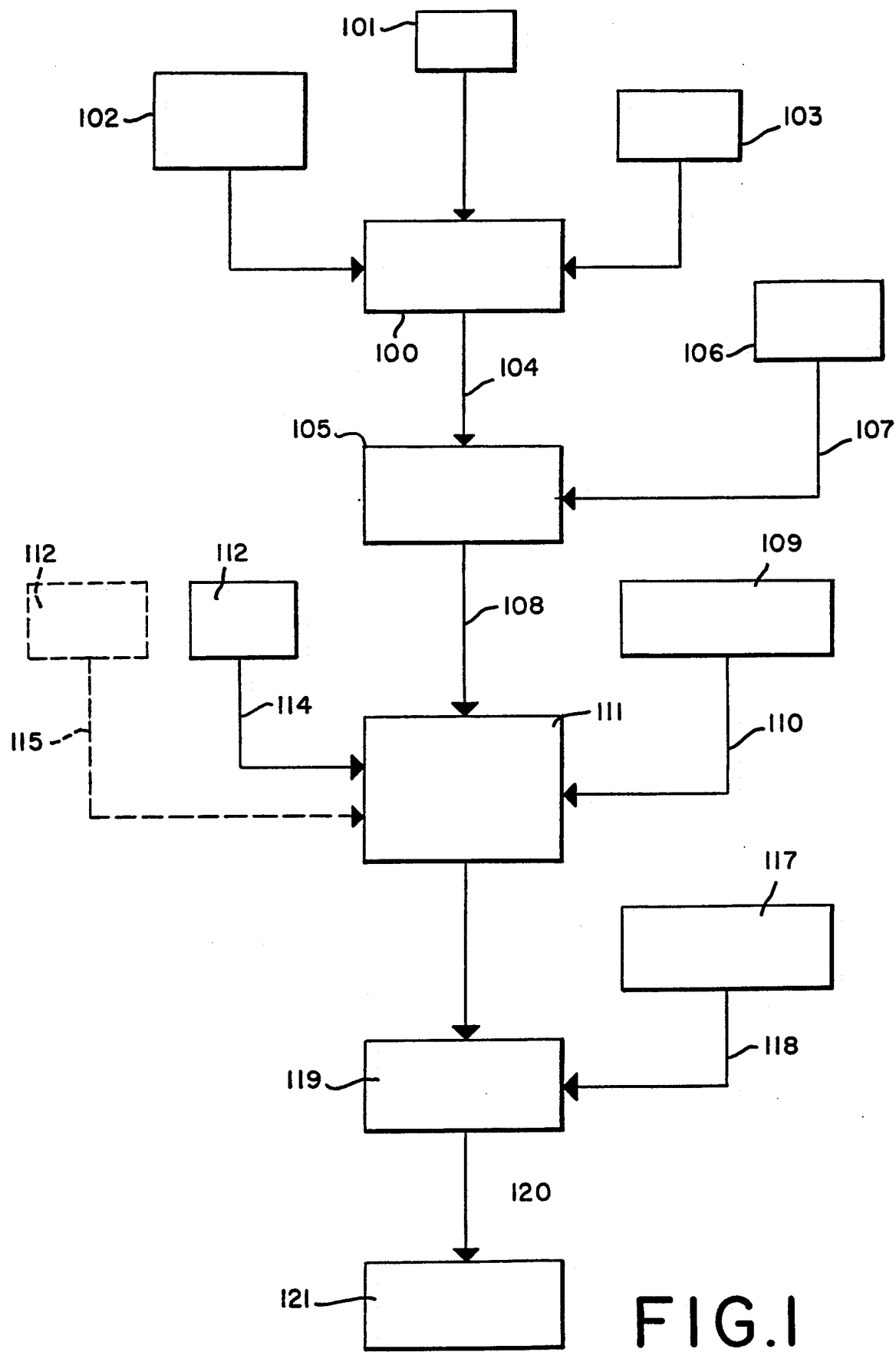
FIG. 1 is a schematic block flow diagram indicating specific apparatus means for carrying out the process for the production of a marinaded proteinaceous foodstuff of our invention.

Our invention concerns a process for producing a marinaded proteinaceous product comprising the steps of:

(a) providing a proteinaceous inner food core having an outer surface (for example, chicken muscle tissue, beef muscle tissue, cubed chicken, pork loin, pork cutlet, beef muscle tissue, ground turkey and the like);

(b) preparing a mixture of:
(i) an inorganic non-toxic phosphate salt (e.g., sodium tripolyphosphate);
(ii) water (q.s.);
(iii) 10–70% of a reaction flavor or mixture of reaction flavor precursors (optionally spray dried) formed by admixing:
1. 30–80% meat (e.g., macerated chicken meat and/or beef taken alone or further together with a meat extract such as commercial beef extract);
2. 0.05%–1.5% of cysteine or a salt thereof (e.g., cysteine hydrochloride);
3. 0.1–1.5% thiamine or a salt thereof (e.g., thiamine hydrochloride);

4. optionally 2-30% of a polysaccharide, e.g., starch and/or sugar(s) or a reducing sugar metabolite (e.g., a furanone of the genus:

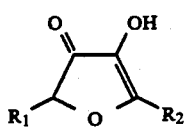

wherein $R_1$ and $R_2$ are the same or different hydrogen or $C_1$-$C_2$ lower alkyl with at least one of $R_1$ and $R_2$ being $C_1$-$C_2$ lower alkyl);

5. optionally, an inorganic salt, e.g., sodium chloride or a salt composition such as that set forth in Example I of U.S. Pat. No. 4,471,002;

6. optionally starch in the event that the flavor is spray dried;

(iv) optionally 5-15% of a non-toxic edible salt other than a phosphate, e.g. sodium chloride; and (v) optionally 5-30% of tomato paste and/or spices; and (c) coating the resulting mixture prepared in (b) onto said surface and simultaneously causing the mixture of (b) to be in intimate contact with substantially the entirety of said first surface for a period of time sufficient to cause the proteinaceous inner food core to permanently absorb or absorb the flavor composition and/or flavor precursors from the mixture (b); and, optionally, (d) cooking the resulting coated proteinaceous inner core.

The reaction flavors useful in the practice of our invention include, but are not limited, to those set forth in the following U.S. Patents:

U.S. Pat. No. 4,076,852 issued on Feb. 28, 1978; and
U.S. Pat. No. 4,081,565 issued on Mar. 28, 1978, for example, the reaction product of (i) enzymatic digest of meat and/or natural meat (ii); thiamine and (iii) cysteine.

These reaction product flavors are preferably mixed with starch and spray dried before being admixed with the remainder of the marinade composition.

The foregoing patents and their disclosures are incorporated herein by reference.

More preferably, the reaction flavor or mixture of reaction flavor precursors useful in the practice of our invention are formed by intimately admixing:

(i) 30-80% of a macerated meat or ground meat (e.g., macerated chicken meat and/or beef taken alone or further together with a meat extract such as commercial beef extract);

(ii) 0.05%-1.5% of cysteine or a salt thereof (e.g., cysteine hydrochloride);

(iii) 0.1-1.5% thiamine or a salt thereof (e.g., thiamine hydrochloride);

(iv) optionally 2-30% of a polysaccharide, e.g., starch and/or sugar(s) or a reducing sugar metabolite (e.g., a furanone of the genus:

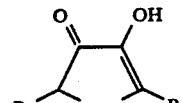

wherein $R_1$ and $R_2$ are the same or different hydrogen or $C_1$-$C_2$ lower alkyl with at least one of $R_1$ and $R_2$ being $C_1$-$C_2$ lower alkyl)

(v) optionally, an inorganic salt, e.g., sodium chloride or a salt composition such as that set forth in Example I of U.S. Pat. No. 4,471,002; and (vi) starch in the event that the reaction flavor is spray dried.

Thus, the reaction flavor can be made separately, that is prior to incorporating into the mixture or the reaction flavor precursors can be added to the foregoing mixture prior to the incorporation of the marinade. Thus, two alternatives exist:

1. The reaction flavor can be prepared as such and preferably sprayed dried and
2. The reaction flavor precursor are made "in situ" as a result of the carrying out the marinating process and each of the reaction flavor precursors are individually sprayed dried with starch (preferably).

In the event that the reaction flavor is to be made initially and separately (as opposed to be made "in situ") then the resulting mixture is heated under the following conditions:

(a) from about 0.5 up to about 5 atmospheres;
(b) from about 80 up to about 170° C.;
(c) for a period of time from about 0.5 up to about 5 hours.

with appropriate agitation , e.g., carrying out the mixing using baffles in the reaction vessel.

Examples of the "meat" component (i) of the flavor precursor compositions and examples of as the proteineous inner food core are (a) to be marinaded; and the results obtained using same in the practice of our invention are set forth in the following Table I:

TABLE I

| Meat Composition of Flavor | Meat Muscle Tissue To Be Marinated | Intense Flavor Nuance Created As A Result Of Carrying Out The Marination Process of Our Invention |
|---|---|---|
| Ground Pork Butt | Pork Cutlet | Sausage |
| Ground Sausage Meat | Ground Turkey | Sausage |
| Ground Beef | Turkey Thigh Cubes | Sirloin Tips |
| Canadian Brand Ham | Pork Loin | Canadian Bacon |

The reaction flavor or reaction flavor components is (are) utilized at a level in the range of from about 10% up to about 70% by weight of the overall marinade mixture.

The value from an organoleptic standpoint of the flavor imparted by the aforementioned marinade composition whether using a finally-created flavor from a prior reaction or a mixture of flavor precursors is shown using a "scale flavor preference of a 10 member flavor panel on a scale of 1-10, with a value of 1 being the least favored and a value of 10 being the most favored".

In all cases the "warmed over" flavor frequently encountered in the meat flavor-food cooking process will be substantially completely "covered" as a result of using the marinade compositions of our invention in all cases in the ranges set forth, supra.

Furthermore, the marinade composition of our invention may contain precursors of the thus produced meat flavors as opposed to the meat flavors themselves; or the marinade compositions may contain mixtures of precursors and the finished food flavors, e.g., a 50:50 weight:weight mixture of the reaction product of cysteine, thiamine and macerated chicken meat taken further together with unreacted cysteine, thiamine and macerated chicken meat; or a reaction product of cysteine, thiamine, beef extract and macerated beef taken together with the individual components; cysteine, thiamine, macerated beef and beef extract.

Any inorganic non-toxic phosphate salt may be used in the practice of our invention, for example, tripotassium phosphate, trisodium phosphate, sodium monoacid phosphate, potassium monoacid phosphate, sodium tripolyphosphate, magnesium phosphate and the like.

In addition to the aforesaid individual phosphates, salt compositions containing phosphates may be used, for example, the salt compositions exemplified in the following U.S. Patents:

U.S. Pat. No. 4,471,002 issued on Sept. 11, 1984;
U.S. Pat. No. 4,514,431 issued on Apr. 30, 1985; and
U.S. Pat. No. 4,514,094 issued on Apr. 30, 1985.

The foregoing patents are incorporated herein by reference.

The percent of salt other than phosphate salt may vary from about 5 up to about 15% by weight of the liquid marinade composition. The percentage of phosphate salt in the liquid marinade composition may vary from about 3 up to about 6% by weight of the liquid marinade composition with a preferred range of from about 3 up to about 4.0% by weight. The percentage of flavor composition and/or flavor precursor composition in the liquid marinade composition may vary from about 10% by weight of the composition up to about 70% by weight of the composition.

In the practice of our invention, a marinade containing a phosphate salt, optionally a salt other than a phosphate, and a flavor composition and/or flavor precursor composition (preferably, previously spray dried with starch) is suspended in a uniform slurry. The slurry is added to the desired proteinaceous substance, e.g., meat such as meat muscle tissue; and allowed to absorb by tumbling in a vacuum drum or manually folding in an open drum.

The marination time may vary from about 10 minutes up to about 2 hours depending on other marination conditions. When carried out at atmospheric pressure at 30° C. under turbulent flow conditions (i.e., using a tumbler with baffles) the marination time is from about 1 up to about 2 hours. When carried out in vacuum, e.g., 0.3 atmospheres under turbulent flow conditions, the marination time is from about 10 up to about 30 minutes (at 30° C.).

Proteinaceous substances that can be treated in this manner are beef pieces, cubes, steaks, chops; chicken parts; fish and bean curd.

The muscle meat when it is used is very sponge-like and will absorb the marinade. Thus, the marinade is both absorbed and adsorbed allowing the phosphate salt to increase the water binding properties of the meat tissue, carrying flavor and/or flavor precursor composition into the meat tissue as an effective application.

The meat product can then be blast-chilled, formed and refrozen for storage until end product use.

A second method involves the aforementioned preparation but also involves the pumping of the marinade composition into a meat carcass using a state of the art needle applicator.

Meats flavored using the aforementioned marinade compositions can be microwaved, conventionally baked, fried, deep-fried or otherwise cooked without loss or degradation to the flavor.

Hence, reaction flavors and/or reaction flavor precursors useful in the practice of our invention totally enhance meat products, patties, frozen entrees, microwave dishes, fast food patties and nuggets.

DETAILED DESCRIPTION OF THE DRAWINGS

FIG. 1 is a schematic block flow diagram setting forth the apparatus means for carrying out the process for producing the marinaded food product of our invention.

Reaction means 100 includes apparatus for admixing and heating cysteine, thiamine and a meat powder for example with the cysteine coming from location 101, the thiamine coming from location 103 and the meat powder coming from location 102. The resulting reaction product is transported along route 104 into spray drying means 105 where starch is admixed with the reaction product at location 105 with the starch coming from location 106 through route 107. The sprayed dried product is then admixed at mixing means 111 which is downstream from spray drying means 105 and the spray dried product enters the mixing means via route 108. Also, blended with the spray dried flavor in mixing means 111 is the phosphate salt coming from location 109 via route 110, water coming from location 112 via route 114, and, optionally, a salt other than the phosphate coming from location 113 via route 115. The resulting marinade is then transported via route 116 to marinading means 119 downstream from said mixing means 111 where the marinating takes place on the meat which comes from location 117 via route 118. The marinating takes place at location 119 and the resulting marinaded product is then transported via route 120 to a storage location 121 from which the marinaded product is consumed or marketed.

Figure 2:
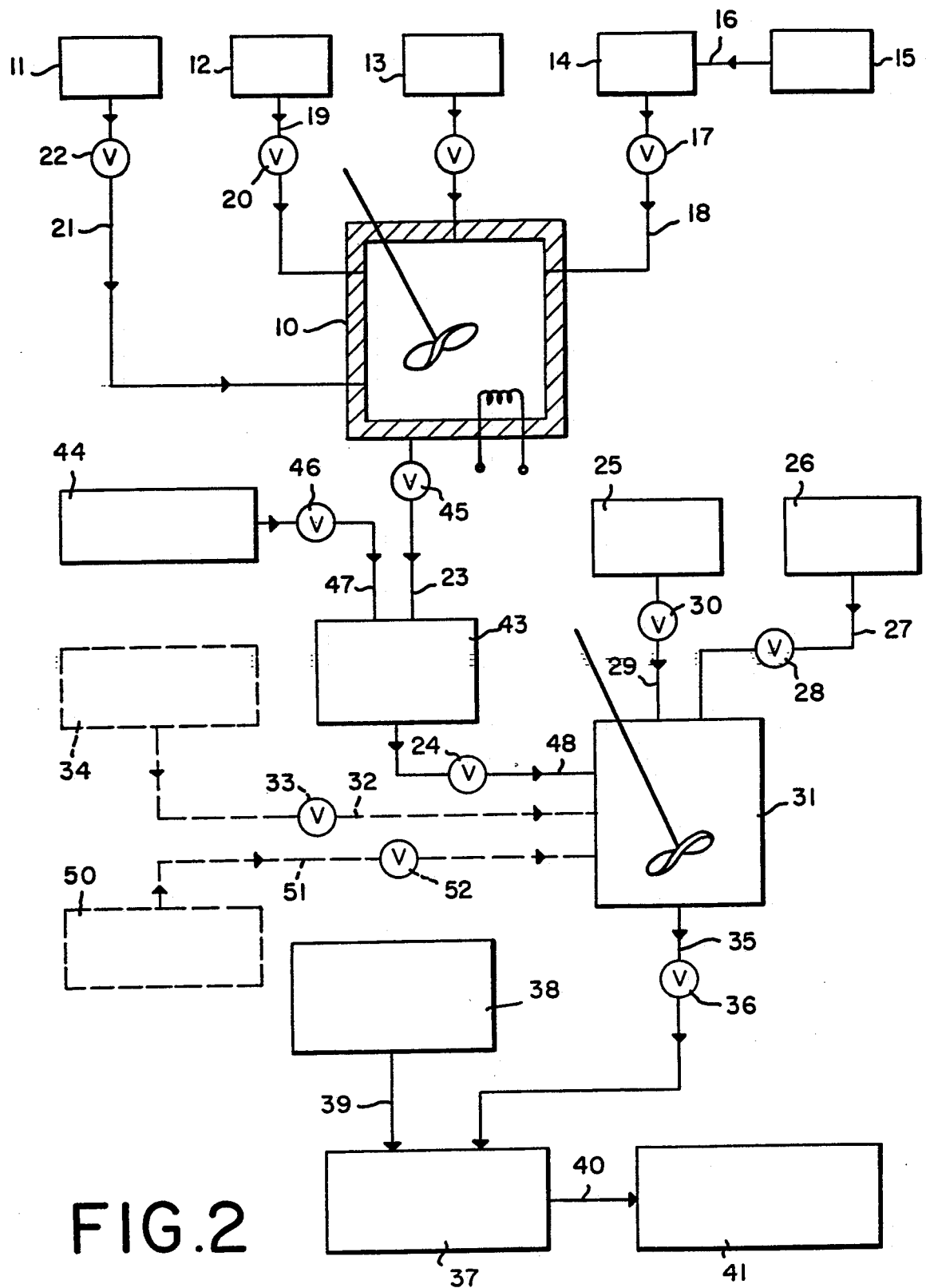
FIG. 2 is a schematic block flow diagram setting forth in schematic form the process steps for preparing a marinaded proteinaceous foodstuff of our invention.

FIG. 2 is a block flow diagram setting forth in more detail the process and apparatus means for carrying out the process of our invention to produce the marinaded product of our invention. Salt from location 11, cysteine from location 12, thiamine from 13, and meat powder from location 14 (produced from meat from location 15 which is transported via route 16) are all admixed in reactor 10 which is equipped with a stirrer and heater. The salt is transported via line 21 past valve 22. The cysteine located at location 12 is transported via line 19 past valve 20. The meat powder located at location 14 is transported through line 18 past valve 17. The reaction product produced in reactor 10 is then transported via line 23 into spray drier 43 and admixed in the spray dryer with modified food starch from location 44 which is past into the spray drier via line 47 past valve 46. The spray drier spray dries the resulting flavor which was previously produced in reactor 10 and the spray dried product is passed through line 48 past valve 24 into mixing vessel 31 wherein the spray dried product is mixed with:

water from location 25 passed through line 29 past valve 30;

a phosphate salt from location 26 passed through line 27 past valve 28;

optionally sodium chloride from location 34 passed through line 32 past valve 33;

and optionally tomato powder and/or spices from location 50 passed through line 51 past valve 52.

The marinade mixture is thus produced in mixing vessel 31. The marinade mixture is then passed through line 35, past valve 36 into the marinading operation apparatus wherein it is coated onto meat to be marinaded which is transported from location 38 through line 39 into the marinading operation apparatus at 37. The marinading operation takes up the time indicated supra at location 37, whereupon it is passed through line 40 into the storage vessel 41 where it is stored, utilized for consumption and/or marketed from location 41.

The following examples are illustrative of our invention but our invention is only limited according to the claims set forth, infra.

EXAMPLE I

The following mixture is prepared:

| Ingredients | Parts by Weight |
| --- | --- |
| Water | 79.6% |
| Flavor (produced by admixing 0.1% cysteine hydrochloride; 0.2% thiamine hydrochloride; 10% sodium chloride; 10% water and 79.2% pork meat powder; refluxing the resulting mixture for a period of 3 hours at 2 atmospheres pressure in an autoclave; admixing the resulting reaction product with starch at the rate of 10% starch and 90% reaction product and spray drying the resulting product in a Bowen laboratory model spray dryer) | 12.5% |
| Sodium chloride | 6.2% |
| Tripotassium phosphate | 4.4% |

The resulting mixture, at a rate of 8% is injected into a chicken meat carcass. The marinade composition is thoroughly absorbed into the meat and maintained for a period of 1.5 hours.

The resulting product is then cooked at 380° F. and then subjected to a 30 second blast-freeze.

The resulting product has an enhanced and succulent Canadian bacon flavor.

EXAMPLE II

The following mixture is prepared:

| Ingredients | Parts by Weight |
| --- | --- |
| Water | 79.6% |
| Flavor (produced by admixing 0.1% cysteine hydrochloride; 0.2% thiamine hydrochloride; 10% sodium chloride; 79.7% beef powder; 10% water and the resulting product is refluxed for a period of 3 hours at 2 atmospheres pressure in an autoclave; and then the autoclave mixture is admixed with starch at the rate of 10% starch and 90% reaction product and spray dried in a Bowen laboratory model spray dryer) | 12.5% |
| Sodium chloride | 6.2% |
| Tripotassium phosphate | 4.4% |

The resulting mixture, at a rate of 8% is injected onto turkey meat cubes. The marinade composition is thoroughly absorbed into the turkey meat cubes and maintained for a period of 1.5 hours.

The resulting product is then cooked at 380° F. and then subjected to a 30 second blast-freeze.

The resulting product has an enhanced and succulent sirloin tips flavor.

EXAMPLE III

The following mixtures for 8% marinades (based upon a weight of 100 grams of chicken) are prepared:

| Ingredients | III (A) (%) Chicken Flavor Marinade (based on entire food product) | III (B) (%) Typical Ethnic Marinade | III (C) (%) Second Ethnic Marinade |
| --- | --- | --- | --- |
| Sodium tripolyphosphate | 0.35 | 0.25 | 0.25 |
| Salt (Sodium Chloride) | 0.50 | — | 0.50 |
| Flavor (reaction product of chicken meat powder, cysteine-hydrochloride and thiamine hydrochloride previously spray dried with starch) (NOTE (1)) | 1.00 | 3.20 | 3.20 |
| Tomato Powder & Spicing | — | — | 1.80 |
| Water | 6.15 | 4.55 | 2.25 |
| TOTAL MARINADE | 8.00 G (For a 92 G Breast) | 8.00 G (For a 92 G Breast) | 8.00 G (For a 92 G Breast) |

The sodium tripolyphosphate is intimately admixed with hot water and dissolved. The sodium chloride and flavor are weighed out and intimately admixed with the sodium tripolyphosphate solution.

A chicken breast is placed in microwavable plastic bag. The marinade is added to the breast and massaged into the breast muscle until most of the liquid is absorbed (this takes approximately 5 minutes).

The plastic bag is sealed and placed in a freezer.

The cooking process is as follows: The plastic bag is punctured and the boneless breast is microwaved for approximately 3.5 minutes on "high" in a 700 watt Amana ® microwave oven.

The resulting product has an enhanced and succulent chicken teriyaki flavor insofar as each of Examples III(A), III(B), and III(C) are concerned. The intensity of the chicken teriyaki flavor for Example III(A) on a scale of 1–10 is approximately 9; the intensity of the chicken teriyaki flavor of Example III(B) on a scale of 1–10 is approximately 7.5 and the intensity of the chicken teriyaki flavor for Example III(C) on a scale of 1–10 is approximately 9.5

Note 1: The flavor is actually prepared by first admixing 0.1% cysteine hydrochloride; 0.2% thiamine hydrochloride; 10% sodium chloride; 10% water and 79.7% chicken meat powder and placing the resulting mixture in an autoclave. The autoclave is closed and heated with mixing to 280° C. for a period of 3 hours. The autoclave is cooled down and opened. The resulting reaction product is then admixed with starch at the rate of 10% starch: 90% reaction product. The resulting product is then spray dried in a laboratory model Bowen spray dryer. The spray dried product is then utilized for the resulting marinade.

What is claimed is:

1. A process for preparing a marinaded proteinaceous food product consisting of the steps of:
   (a) providing a meat muscle tissue inner food core having an outer surface;
   (b) preparing a marinade mixture consisting of:
      (i) from about 3 up to about 6% by weight of said marinade mixture of an inorganic non-toxic phosphate salt;
      (ii) water;
      (iii) from about 10% up to about 70% by weight of said marinade mixture of a reaction flavor produced by admixing:
         1. 30–80% of a macerated meat;
         2. 0.05–1.5% of cysteine hydrochloride;
         3. 0.1–1.5% of thiamine hydrochloride;
         4. optionally, 2–30% of a polysaccharide and/or a reducing sugar metabolite; and, optionally,
         5. an inorganic salt other than a phosphate to form an admixture and then heating said admixture;
      (iv) optionally, from about 5 up to about 15% by weight of said marinade mixture of a non-toxic edible salt other than a phosphate salt; and
      (v) optionally, from about 5 up to about 30% by weight of said marinade mixture of tomato paste and/or a spice;
   (c) coating the resulting mixture prepared in (b) onto said outer surface and simultaneously causing the mixture of (b) to be in intimate contact with substantially the entirety of said outer surface for a period of time sufficient to cause said meat muscle tissue inner food core to permanently absorb or adsorb said reaction flavor from the mixture (b); and then
   (d) cooking the resulting coated meat muscle tissue inner core.

2. The product produced according to the process of claim 1.

3. The process of claim 1 wherein the marinade mixture is pumped into the proteinaceous inner food core using a needle applicator.

4. The product produced according to the process of claim 3.

5. The process of claim 1 wherein the reaction flavor is a reaction product of cysteine hydrochloride, thiamine hydrochloride and chicken meat powder.

6. The product produced according to the process of claim 5.

7. The process of claim 1 wherein the reaction flavor is a reaction product of cysteine hydrochloride, thiamine hydrochloride and pork meat powder.

8. The product produced according to the process of claim 7.

9. The process of claim 1 wherein the reaction flavor is a reaction product of cysteine hydrochloride, thiamine hydrochloride and beef meat powder.

10. The product produced according to the process of claim 9.

11. A process for preparing a marinaded proteinaceous food product consisting of the steps of:
    (a) providing a meat muscle tissue inner food core having an outer surface;
    (b) preparing a marinade mixture consisting of:
       (i) from about 3 up to about 6% by weight of said marinade mixture of an inorganic non-toxic phosphate salt;
       (ii) water;
       (iii) from about 10% up to about 70% by weight of said marinade mixture of a mixture of reaction flavor precursors produced by admixing:
          1. 30–80% of a macerated meat;
          2. 0.05–1.5% of cysteine hydrochloride;
          3. 0.1–1.5% of thiamine hydrochloride;
          4. optionally, 2–30% of a polysaccharide and/or a reducing sugar metabolite; and, optionally,
          5. an inorganic salt other than a phosphate;
       (iv) optionally, from about 5 up to about 15% by weight of said marinade mixture of a non-toxic edible salt other than a phosphate salt; and
       (v) optionally, from about 5 to about 30% by weight of said marinade mixture of tomato paste and/or a spice;
    (c) coating the resulting mixture prepared in (b) onto said outer surface and simultaneously causing the mixture of (b) to be in intimate contact with substantially the entirety of said outer surface for a period of time sufficient to cause said meat muscle tissue inner food core to permanently absorb or adsorb said mixture of reaction flavor precursors from the mixture (b); and then
    (d) cooking the resulting coated meat muscle tissue inner core.

12. The product provided according to the process of claim 11.

* * * * *